(12) United States Patent
Doddington (10) Patent No.: US 7,366,722 B2
(45) Date of Patent: Apr. 29, 2008

(54) SYSTEM AND METHOD FOR SPECIFYING APPLICATION SERVICES AND DISTRIBUTING THEM ACROSS MULTIPLE PROCESSORS USING XML

(75) Inventor: Andrew Doddington, London (GB)

(73) Assignee: JP Morgan Chase Bank, New York, NY (US)

( * ) Notice: Subject to any disclaimer, the term of this patent is extended or adjusted under 35 U.S.C. 154(b) by 372 days.

(21) Appl. No.: 10/667,808

(22) Filed: Sep. 22, 2003

(65) Prior Publication Data

US 2004/0230587 A1    Nov. 18, 2004

(51) Int. Cl.
G06F 17/30 (2006.01)
(52) U.S. Cl. .............................. 707/10; 707/9; 707/101; 707/102; 707/203; 707/204; 707/205; 717/106
(58) Field of Classification Search ................ 717/106; 707/100, 9, 101, 102, 203, 204, 205, 10; 713/177, 186, 201, 157; 715/500, 513; 455/446
See application file for complete search history.

(56) References Cited

U.S. PATENT DOCUMENTS

| | | | |
|---|---|---|---|
| 4,751,702 A | | 6/1988 | Beier et al. |
| 5,027,269 A | | 6/1991 | Grant et al. |
| 5,261,095 A | * | 11/1993 | Crawford et al. ........... 717/149 |
| 5,301,320 A | | 4/1994 | McAtee et al. |
| 5,325,527 A | | 6/1994 | Cwikowski et al. |
| 5,499,371 A | | 3/1996 | Henninger et al. |
| 5,539,885 A | | 7/1996 | Ono et al. |
| 5,553,235 A | | 9/1996 | Chen et al. |
| 5,566,297 A | | 10/1996 | Devarakonda |
| 5,594,863 A | | 1/1997 | Stiles |
| 5,630,047 A | | 5/1997 | Wang |
| 5,630,173 A | | 5/1997 | Oprescu |
| 5,673,403 A | | 9/1997 | Brown et al. |
| 5,689,698 A | | 11/1997 | Jones et al. |
| 5,692,181 A | | 11/1997 | Anand et al. |

(Continued)

FOREIGN PATENT DOCUMENTS

WO          01/35209          5/2001

(Continued)

OTHER PUBLICATIONS

Norman Walsh, understanding XML schemas, Jul. 1, 1999.*

(Continued)

*Primary Examiner*—Thuy N. Pardo
(74) *Attorney, Agent, or Firm*—Lowenstein Sandler, PC (57) ABSTRACT

A system and method that uses XML schemas to specify the set of allowed calls, to invoke multiple function calls, either hierarchically or sequentially, and to specify the calls in such a way that they can be distributed across multiple processors. An XML schema mechanism defines the format of permitted requests and, importantly, validates the requests to ensure that they match the published signature of the functions provided by the service application. Additionally, the schema mechanism validates the request to ensure that they match the published signature of any further service application that it may need to employ. In addition, supplementary information added either within the schema itself or in supporting documents may be processed programmatically. A request may consist of a hierarchy of function calls, either nested within one another or executing in series.

14 Claims, 13 Drawing Sheets

U.S. PATENT DOCUMENTS

| | | |
|---|---|---|
| 5,712,971 A | 1/1998 | Stanfill et al. |
| 5,717,925 A | 2/1998 | Harper et al. |
| 5,732,262 A | 3/1998 | Gillespie et al. |
| 5,734,887 A | 3/1998 | Kingberg et al. |
| 5,737,592 A | 4/1998 | Nguyen et al. |
| 5,761,499 A | 6/1998 | Sonderegger |
| 5,768,119 A | 6/1998 | Havekost et al. |
| 5,784,557 A | 7/1998 | Oprescu |
| 5,790,809 A | 8/1998 | Holmes |
| 5,801,689 A | 9/1998 | Huntsman |
| 5,802,367 A | 9/1998 | Held et al. |
| 5,806,075 A | 9/1998 | Jain et al. |
| 5,815,415 A | 9/1998 | Bentley et al. |
| 5,845,292 A | 12/1998 | Bohannon et al. |
| 5,889,992 A | 3/1999 | Koerber |
| 5,899,990 A | 5/1999 | Maritzen et al. |
| 5,926,637 A | 7/1999 | Cline et al. |
| 5,930,768 A | 7/1999 | Hooban |
| 5,937,198 A | 8/1999 | Nelson et al. |
| 5,937,402 A | 8/1999 | Pandit |
| 5,946,458 A | 8/1999 | Austin et al. |
| 5,949,412 A | 9/1999 | Huntsman |
| 5,960,200 A | 9/1999 | Eager et al. |
| 5,960,445 A | 9/1999 | Tamori et al. |
| 5,987,247 A | 11/1999 | Lau |
| 5,999,179 A | 12/1999 | Kekic et al. |
| 6,003,075 A | 12/1999 | Arendt et al. |
| 6,009,274 A | 12/1999 | Fletcher et al. |
| 6,009,405 A | 12/1999 | Leymann et al. |
| 6,011,916 A | 1/2000 | Moore et al. |
| 6,046,742 A | 4/2000 | Chari |
| 6,052,456 A | 4/2000 | Huang |
| 6,065,009 A | 5/2000 | Leymann et al. |
| 6,083,276 A | 7/2000 | Davidson et al. |
| 6,101,489 A | 8/2000 | Lannert et al. |
| 6,101,601 A | 8/2000 | Matthews et al. |
| 6,108,698 A | 8/2000 | Tenev et al. |
| 6,148,296 A | 11/2000 | Tabbara |
| 6,163,776 A | 12/2000 | Periwal |
| 6,173,439 B1 | 1/2001 | Carlson et al. |
| 6,178,409 B1 | 1/2001 | Weber et al. |
| 6,184,996 B1 | 2/2001 | Gase |
| 6,185,613 B1 | 2/2001 | Lawson et al. |
| 6,195,676 B1 | 2/2001 | Spix et al. |
| 6,226,684 B1 | 5/2001 | Sung et al. |
| 6,230,319 B1 | 5/2001 | Britt, Jr. et al. |
| 6,246,410 B1 | 6/2001 | Bergeron et al. |
| 6,249,877 B1 | 6/2001 | Kawakami et al. |
| 6,253,193 B1 | 6/2001 | Ginter et al. |
| 6,272,556 B1 | 8/2001 | Gish |
| 6,282,698 B1 | 8/2001 | Baker et al. |
| 6,288,790 B1 | 9/2001 | Yellepeddy et al. |
| 6,289,336 B1 | 9/2001 | Melton et al. |
| 6,292,933 B1 | 9/2001 | Bahrs et al. |
| 6,298,353 B1 | 10/2001 | Apte |
| 6,304,871 B1 | 10/2001 | Gajda et al. |
| 6,314,430 B1 | 11/2001 | Chang |
| 6,317,738 B1 | 11/2001 | Lohman et al. |
| 6,324,525 B1 | 11/2001 | Kramer et al. |
| 6,324,619 B1 | 11/2001 | Raverdy et al. |
| 6,332,161 B1 | 12/2001 | Sasson |
| 6,353,820 B1 | 3/2002 | Edwards et al. |
| 6,363,363 B1 | 3/2002 | Haller et al. |
| 6,363,499 B1 | 3/2002 | Delo et al. |
| 6,381,609 B1 | 4/2002 | Breitbart et al. |
| 6,430,556 B1 | 8/2002 | Goldberg et al. |
| 6,438,749 B1 | 8/2002 | Chamberlain |
| 6,442,533 B1 | 8/2002 | Hinkle |
| 6,442,748 B1 | 8/2002 | Bowman-Amuah |
| 6,453,127 B2 | 9/2002 | Wood et al. |
| 6,463,343 B1 | 10/2002 | Emens et al. |
| 6,463,439 B1 | 10/2002 | Dahlberg |
| 6,467,079 B1 | 10/2002 | Ettritch et al. |
| 6,470,384 B1 | 10/2002 | O'Brian et al. |
| 6,473,786 B1 | 10/2002 | Scouras et al. |
| 6,477,580 B1 | 11/2002 | Bowman-Amuah |
| 6,477,590 B1 | 11/2002 | Habusha et al. |
| 6,480,860 B1 | 11/2002 | Monday |
| 6,480,894 B1 | 11/2002 | Courts et al. |
| 6,484,310 B1 | 11/2002 | Przybylski et al. |
| 6,502,095 B2 | 12/2002 | Breitbart et al. |
| 6,502,207 B1 | 12/2002 | Itoh et al. |
| 6,505,238 B1 | 1/2003 | Tran |
| 6,510,352 B1 | 1/2003 | Badavas et al. |
| 6,518,983 B1 | 2/2003 | Grohmann et al. |
| 6,526,571 B1 | 2/2003 | Aizikowitz et al. |
| 6,539,337 B1 | 3/2003 | Provan et al. |
| 6,546,419 B1 | 4/2003 | Humpleman et al. |
| 6,553,428 B1 | 4/2003 | Ruehle et al. |
| 6,557,039 B1 | 4/2003 | Leong et al. |
| 6,571,282 B1 | 5/2003 | Bowman-Amuah |
| 6,571,389 B1 | 5/2003 | Spyker et al. |
| 6,578,068 B1 | 6/2003 | Bowman-Amuah |
| 6,584,497 B1 | 6/2003 | Case et al. |
| 6,590,587 B1 | 7/2003 | Wichelman et al. |
| 6,594,823 B1 * | 7/2003 | Corbin et al. ............... 717/143 |
| 6,615,258 B1 | 9/2003 | Barry et al. |
| 6,643,679 B1 | 11/2003 | Erickson et al. |
| 6,654,784 B1 | 11/2003 | Wei |
| 6,657,625 B1 | 12/2003 | Chik et al. |
| 6,675,228 B1 | 1/2004 | Bahrs et al. |
| 6,725,231 B2 | 4/2004 | Hu et al. |
| 6,928,488 B1 | 8/2005 | de Jong et al. |
| 7,234,103 B1 * | 6/2007 | Regan ........................ 715/500 |
| 7,302,634 B2 * | 11/2007 | Lucovsky et al. ............ 707/10 |
| 2001/0020255 A1 | 9/2001 | Hofmann et al. |
| 2001/0029604 A1 | 10/2001 | Dreyband et al. |
| 2002/0010867 A1 | 1/2002 | Schaefer et al. |
| 2002/0046239 A1 | 4/2002 | Stawikowski et al. |
| 2002/0055804 A1 | 5/2002 | Betawar et al. |
| 2002/0062475 A1 | 5/2002 | Iborra et al. |
| 2002/0065814 A1 | 5/2002 | Okamoto et al. |
| 2002/0069156 A1 | 6/2002 | Adam et al. |
| 2002/0069192 A1 | 6/2002 | Aegerter |
| 2002/0078115 A1 | 6/2002 | Poff et al. |
| 2002/0103725 A1 | 8/2002 | Martin et al. |
| 2002/0103835 A1 | 8/2002 | Kearney |
| 2002/0109718 A1 | 8/2002 | Mansour et al. |
| 2002/0111995 A1 | 8/2002 | Mansour et al. |
| 2002/0111999 A1 | 8/2002 | Andersson |
| 2002/0116205 A1 | 8/2002 | Ankireddipally et al. |
| 2002/0120685 A1 | 8/2002 | Srivastava et al. |
| 2002/0124113 A1 | 9/2002 | Gargya et al. |
| 2002/0129096 A1 | 9/2002 | Mansour et al. |
| 2002/0133579 A1 | 9/2002 | Bernhardt et al. |
| 2002/0143721 A1 | 10/2002 | Charlet et al. |
| 2002/0143819 A1 | 10/2002 | Han et al. |
| 2002/0144101 A1 | 10/2002 | Wang et al. |
| 2002/0147857 A1 | 10/2002 | Sanchez, II et al. |
| 2002/0178191 A1 | 11/2002 | Sielken |
| 2002/0178434 A1 | 11/2002 | Fox et al. |
| 2002/0184504 A1 * | 12/2002 | Hughes ..................... 713/177 |
| 2002/0188765 A1 | 12/2002 | Fong et al. |
| 2002/0188928 A1 | 12/2002 | Szpak et al. |
| 2003/0009323 A1 | 1/2003 | Adeli |
| 2003/0028555 A1 | 2/2003 | Young et al. |
| 2003/0033121 A1 | 2/2003 | Chen et al. |
| 2003/0033159 A1 | 2/2003 | Altomare |
| 2003/0036809 A1 | 2/2003 | Landman et al. |
| 2003/0046317 A1 | 3/2003 | Cseri et al. |
| 2003/0050897 A1 | 3/2003 | Altomare |
| 2003/0069907 A1 | 4/2003 | Moreau |
| 2003/0084067 A1 | 5/2003 | Obiaya |
| 2003/0093574 A1 | 5/2003 | Fablet et al. |

| | | | |
|---|---|---|---|
| 2003/0097383 | A1 | 5/2003 | Smirnov et al. |
| 2003/0140308 | A1* | 7/2003 | Murthy et al. .............. 715/500 |
| 2003/0140332 | A1* | 7/2003 | Norton et al. .............. 717/106 |
| 2003/0160813 | A1 | 8/2003 | Raju |
| 2003/0182458 | A1 | 9/2003 | Ali et al. |
| 2003/0182578 | A1* | 9/2003 | Warnock et al. ............ 713/201 |
| 2003/0216927 | A1* | 11/2003 | Sridhar et al. ................. 705/1 |
| 2003/0217033 | A1 | 11/2003 | Sandler et al. |
| 2004/0025030 | A1* | 2/2004 | Corbett-Clark et al. ..... 713/186 |
| 2004/0073870 | A1* | 4/2004 | Fuh et al. ................... 715/513 |
| 2004/0107183 | A1 | 6/2004 | Mangan |
| 2004/0216086 | A1* | 10/2004 | Bau .......................... 717/114 |
| 2004/0230587 | A1 | 11/2004 | Doddington |
| 2005/0030555 | A1 | 2/2005 | Phenix et al. |
| 2006/0036448 | A1* | 2/2006 | Haynie et al. ................. 705/1 |
| 2006/0136719 | A1* | 6/2006 | Doyle et al. ................ 713/157 |
| 2006/0276196 | A1* | 12/2006 | Jiang et al. ................. 455/446 |

FOREIGN PATENT DOCUMENTS

| | | |
|---|---|---|
| WO | 01/63529 | 8/2001 |
| WO | 02/46916 | 6/2002 |
| WO | 02/46980 | 6/2002 |
| WO | 03/001373 | 1/2003 |

OTHER PUBLICATIONS

Thomas; Enterprise Javabeans(TM) Technology: Server Component Model for the Java(TM) Platform, java.sun.com, May 21, 1999.

Rennhackkamp; One for the Road: Sybaseæs Adaptive Server Anywhere 6.0, M&T Publishing Inc., Section No. 10, vol. 11, p. 55, ISSN. 1041-5173; Sep. 1998.

McClanahan; Powerbuilder3.0, M&T Publishing Inc., vol. 6, No. 11, p. 57, ISSN. 1041-5173, Oct. 1993.

Unknown; Conjuring up Com Through Scripting, p. 14, Jul. 2000.

Quantum SPC/DC Script File (.TDF) Definition Instruction Guide, ASI Data Myte Inc., Version 2.4, p. 2-14.

Myers; Scripting Graphical Applications by Demonstration, Human Computer Interaction Institute, Carnegie Mellon University, www.cs.cmu.edu/bam, p. 1-8, Apr. 1998.

Ousterhoust; Scripting Higher Level Programming for the 21st Century, Sun Microsystems Laboratories, Draft #2, p. 1-14, May 10, 1997.

Dolev, et al.; An Integrated Architecture for the Scalable Delivery of Semi-Dynamic Web Content, Proceedings of the Seventh International Symposium on Computers and Communications, IEEE, 2002.

Betwixt: Turning Beans Into XML, Apache Software Foundation, Archived Jun. 20, 2002 at <http://web.archive.org/web/20020620000410/http://jakarta.apahce.org.commons/betwixt/>, p. 1 of 1, Nov. 13, 2005.

XML Schema Part 0 Primer-W3C Working Draft, W3C, Feb. 2000, Retrieved from the Internet on Nov. 18, 2005 at <http://www.w3.org/tr/2000/wd-xmlschema-0-20000225/>, 42 pages.

Carrano, et al.; Data Abstraction and Problem Solving with C++, Aug. 1998, Addison-Wesley, Chapter 2.

Brodkin; Use XML Data Binding to Do Your Laundry, Retrieved From the Internet on May 19, 2006, Retrieved From the Internet at http://www.javaworld.com/javaworld/jw-12-2001/jw-1228-jaxb.html.

Tam et al., A Fast and Flexible Framework of Scripting for Web Application Development: A Preliminary Experience Report, Jun. 19-21, 2000, IEEE vol. 1, pp. 45-455.

Bakker et al, Next Generation Service Creation Using XML Scripting Languages, Apr. 28-May 2, 2002, IEEE, vol. 4, pp. 2001-2007.

Roodyn et al., A Architectural Style for Multiple Real-Time Data Feeds, May 16-22, 1999, IEEE, pp. 564-572.

* cited by examiner

```
<perform>
  <operation name="Sum">
    <operation name="GetComplexResult"/>
    <operation name="GetComplexResult"/>
    <operation name="GetComplexResult"/>
    <operation name="GetComplexResult"/>
    --- more here ---
    <operation name="GetComplexResult"/>
  </operation>
</perform>
```

FIG. 3

```
<perform>
<operation name="Sum" parallel="yes">
<operation name="GetComplexResult"/>
<operation name="GetComplexResult"/>
<operation name="GetComplexResult"/>
<operation name="GetComplexResult"/>
--- more here ---
<operation name="GetComplexResult"/>
</operation>
</perform>
```

FIG. 4

```
<?xml version="1.0" encoding="UTF-8"?>
<!-- edited with XMLSPY v5 rel. 3 U (http://www.xmlspy.com) by Andrew Doddington (JP Morgan Chase) -->
<xs:schema xmlns:xs="http://www.w3.org/2001/XMLSchema" elementFormDefault=
"qualified"    attributeFormDefault="unqualified">
<!-- First define our core container - a request containing zero or more values or voids -->
  <xs:element name="request">
    <xs:annotation>
      <xs:documentation>
        A sequence of zero or more values and/or void results
          - including both inline constants and method calls.
      </xs:documentation>
    </xs:annotation>
    <xs:complexType>
      <xs:choice maxOccurs="unbounded">
        <xs:element ref="AbstractValue"/>
        <xs:element ref="AbstractVoid"/>
      </xs:choice>
      <xs:attribute name="service" type="xs:string" use="optional" default="edgService"/>
    </xs:complexType>
  </xs:element>
  <xs:element name="AbstractValue" abstract="true">
    <xs:annotation>
      <xs:documentation>Represents an arbitrary value.</xs:documentation>
    </xs:annotation>
  </xs:element>
  <xs:element name="AbstractVoid" abstract="true">
    <xs:annotation>
      <xs:documentation>
        Represents the concept of something with *no* value.
      </xs:documentation>
    </xs:annotation>
  </xs:element>
  <xs:element name="DoubleValue" abstract="true" substitutionGroup="AbstractValue">
    <xs:annotation>
      <xs:documentation>An arbitrary double precsion floating-point value.</xs:documentation>
    </xs:annotation>
  </xs:element>
  <xs:element name="DoubleConstant" type="xs:double" substitutionGroup="DoubleValue">
    <xs:annotation>
      <xs:documentation>
        A floating-point value, expressed as an in-line constant.
      </xs:documentation>
    </xs:annotation>
  </xs:element>
```

FIG. 5

```
<xs:element name="FloatValue" abstract="true" substitutionGroup="DoubleValue">
    <xs:annotation>
        <xs:documentation>An arbitrary floating-point value.</xs:documentation>
    </xs:annotation>
</xs:element>
<xs:element name="FloatConstant" type="xs:float" substitutionGroup="FloatValue">
    <xs:annotation>
        <xs:documentation>
            A floating-point value, expressed as an in-line constant.
        </xs:documentation>
    </xs:annotation>
</xs:element>
<xs:element name="IntegerValue" abstract="true" substitutionGroup="AbstractValue">
    <xs:annotation>
        <xs:documentation>An arbitrary integer value.</xs:documentation>
    </xs:annotation>
</xs:element>
<xs:element name="IntegerConstant" type="xs:integer" substitutionGroup="IntegerValue">
    <xs:annotation>
        <xs:documentation>A integer value, expressed as an in-line constant.</xs:documentation>
    </xs:annotation>
</xs:element>
<xs:element name="StringValue" abstract="true" substitutionGroup="AbstractValue">
    <xs:annotation>
        <xs:documentation>An arbitrary string value.</xs:documentation>
    </xs:annotation>
</xs:element>
<xs:element name="StringConstant" type="xs:string" substitutionGroup="StringValue">
    <xs:annotation>
        <xs:documentation>A string value, expressed as an in-line constant.</xs:documentation>
    </xs:annotation>
</xs:element>
<xs:complexType name="FunctionDecl">
    <xs:annotation>
        <xs:documentation>The base type for all function blocks.</xs:documentation>
    </xs:annotation>
</xs:complexType>
<xs:complexType name="StructureDecl">
    <xs:annotation>
        <xs:documentation>The base type for all structs.</xs:documentation>
    </xs:annotation>
</xs:complexType>
```

FIG. 6

```
<xs:complexType name="SingleFloat">
    <xs:annotation>
        <xs:documentation>
            An argument list consisting of a single floating point value.
        </xs:documentation>
    </xs:annotation>
    <xs:complexContent>
        <xs:extension base="FunctionDecl">
            <xs:sequence>
                <xs:element ref="FloatValue">
                    <xs:annotation>
                        <xs:appinfo source=
                            "http://www.jpmorgan.com/fort/procml/name">x</xs:appinfo>
                    </xs:annotation>
                </xs:element>
            </xs:sequence>
        </xs:extension>
    </xs:complexContent>
</xs:complexType>
<xs:complexType name="ManyFloat">
    <xs:annotation>
        <xs:documentation>
            An argument list consisting of a single floating point value.
        </xs:documentation>
    </xs:annotation>
    <xs:complexContent>
        <xs:extension base="FunctionDecl">
            <xs:sequence maxOccurs="unbounded">
                <xs:element ref="FloatValue">
                    <xs:annotation>
                        <xs:appinfo source=
                            "http://www.jpmorgan.com/fort/procml/name">X</xs:appinfo>
                    </xs:annotation>
                </xs:element>
            </xs:sequence>
        </xs:extension>
    </xs:complexContent>
</xs:complexType>
```

FIG. 7

```xml
<xs:complexType name="Float_Float">
    <xs:annotation>
        <xs:documentation>An argument list consisting of a two floating point values.</xs:documentation>
    </xs:annotation>
    <xs:complexContent>
        <xs:extension base="FunctionDecl">
            <xs:sequence>
                <xs:element ref="FloatValue">
                    <xs:annotation>
                        <xs:appinfo source=
                            "http://www.jpmorgan.com/fort/procml/name">X</xs:appinfo>
                    </xs:annotation>
                </xs:element>
                <xs:element ref="FloatValue">
                    <xs:annotation>
                        <xs:appinfo source=
                            "http://www.jpmorgan.com/fort/procml/name">Y</xs:appinfo>
                    </xs:annotation>
                </xs:element>
            </xs:sequence>
        </xs:extension>
    </xs:complexContent>
</xs:complexType>
<xs:element name="Sum" substitutionGroup="FloatValue">
    <xs:annotation>
        <xs:documentation>
            A function that takes one or more floats and returns their sum.
        </xs:documentation>
    </xs:annotation>
    <xs:complexType>
        <xs:complexContent>
            <xs:extension base="ManyFloat"/>
        </xs:complexContent>
    </xs:complexType>
</xs:element>
<xs:element name="Product" substitutionGroup="FloatValue">
    <xs:annotation>
        <xs:documentation>
            A function that takes one or more floats and returns their product.
        </xs:documentation>
    </xs:annotation>
    <xs:complexType>
        <xs:complexContent>
            <xs:extension base="ManyFloat"/>
        </xs:complexContent>
    </xs:complexType>
</xs:element>
```

FIG. 8

```
<xs:element name="PercentageValue" abstract="true" substitutionGroup="FloatValue">
    <xs:annotation>
        <xs:documentation>A (logically) constrained floating-point value.</xs:documentation>
    </xs:annotation>
</xs:element>
<xs:element name="PercentageConstant" substitutionGroup="PercentageValue">
    <xs:annotation>
        <xs:documentation>Percentage constants can be physically constrained by the schema.</xs:documentation>
    </xs:annotation>
    <xs:simpleType>
        <xs:restriction base="xs:float">
            <xs:minInclusive value="0"/>
            <xs:maxInclusive value="100"/>
        </xs:restriction>
    </xs:simpleType>
</xs:element>
<xs:element name="Person">
    <xs:annotation>
        <xs:documentation>A Person structure (with three fields:- Name/Age/Salary).</xs:documentation>
    </xs:annotation>
    <xs:complexType>
        <xs:complexContent>
            <xs:extension base="StructureDecl">
                <xs:sequence>
                    <xs:element ref="StringValue">
                        <xs:annotation>
                            <xs:appinfo source=
                                "http://www.jpmorgan.com/fort/procml/name">name</xs:appinfo>
                        </xs:annotation>
                    </xs:element>
                    <xs:element ref="IntegerValue">
                        <xs:annotation>
                            <xs:appinfo source=
                                "http://www.jpmorgan.com/fort/procml/name">age</xs:appinfo>
                        </xs:annotation>
                    </xs:element>
                    <xs:element ref="FloatValue">
                        <xs:annotation>
                            <xs:appinfo source=
                                "http://www.jpmorgan.com/fort/procml/name">salary</xs:appinfo>
                        </xs:annotation>
                    </xs:element>
                </xs:sequence>
            </xs:extension>
        </xs:complexContent>
    </xs:complexType>
</xs:element>
```

FIG. 9

```
<xs:element name="Negate" substitutionGroup="FloatValue">
    <xs:annotation>
        <xs:documentation>
            A function that takes a float and returns its negation.
        </xs:documentation>
    </xs:annotation>
    <xs:complexType>
        <xs:complexContent>
            <xs:extension base="SingleFloat"/>
        </xs:complexContent>
    </xs:complexType>
</xs:element>
<xs:element name="Add" substitutionGroup="FloatValue">
    <xs:annotation>
        <xs:documentation>
            A function that takes exactly two floating points values and returns their sum.
        </xs:documentation>
    </xs:annotation>
    <xs:complexType>
        <xs:complexContent>
            <xs:extension base="Float_Float"/>
        </xs:complexContent>
    </xs:complexType>
</xs:element>
<xs:element name="Multiply" substitutionGroup="FloatValue">
    <xs:annotation>
        <xs:documentation>
            A function that takes exactly two floating points values and returns their product.
        </xs:documentation>
    </xs:annotation>
    <xs:complexType>
        <xs:complexContent>
            <xs:extension base="Float_Float"/>
        </xs:complexContent>
    </xs:complexType>
</xs:element>
```

FIG. 10

```
<xs:element name="SavePersonDetails" substitutionGroup="AbstractVoid">
    <xs:annotation>
        <xs:documentation>Function that takes a person structure.</xs:documentation>
    </xs:annotation>
    <xs:complexType>
        <xs:complexContent>
            <xs:extension base="FunctionDecl">
                <xs:sequence>
                    <xs:element ref="Person">
                        <xs:annotation>
                            <xs:appinfo source=
                                "http://www.jpmorgan.com/fort/procml/name">thePerson</xs:appinfo>
                        </xs:annotation>
                    </xs:element>
                </xs:sequence>
            </xs:extension>
        </xs:complexContent>
    </xs:complexType>
</xs:element>
<xs:element name="ModifyPersonSalary" substitutionGroup="AbstractVoid">
    <xs:annotation>
        <xs:documentation>A function that takes a Person structure plus a float.</xs:documentation>
    </xs:annotation>
    <xs:complexType>
        <xs:complexContent>
            <xs:extension base="FunctionDecl">
                <xs:sequence>
                    <xs:element ref="Person">
                        <xs:annotation>
                            <xs:appinfo source=
                                "http://www.jpmorgan.com/fort/procml/name">thePerson</xs:appinfo>
                        </xs:annotation>
                    </xs:element>
                    <xs:element ref="FloatValue">
                        <xs:annotation>
                            <xs:appinfo source=
                                "http://www.jpmorgan.com/fort/procml/name">newSalary</xs:appinfo>
                        </xs:annotation>
                    </xs:element>
                </xs:sequence>
            </xs:extension>
        </xs:complexContent>
    </xs:complexType>
</xs:element>
</xs:schema>
```

FIG. 11

```xml
<?xml version="1.0" encoding="UTF-8"?>
<request xmlns:xsi="http://www.w3.org/2001/XMLSchema-instance"
xsi:noNamespaceSchemaLocation="C:\development\procml\xsd\procml.xsd">
        <!-- A simple value -->
        <FloatConstant>3.14</FloatConstant>
        <PercentageConstant>3.14</PercentageConstant>
        <!-- A simple function call -->
        <Add>
                <!-- Argument 1 -->
                <FloatConstant>123.45</FloatConstant>
                <!-- Argument 2 -->
                <FloatConstant>567.89</FloatConstant>
        </Add>
        <!-- A simple nested function call -->
        <Negate>
                <Add>
                        <!-- Argument 1 -->
                        <FloatConstant>123.45</FloatConstant>
                        <!-- Argument 2 -->
                        <FloatConstant>567.89</FloatConstant>
                </Add>
        </Negate>
        <!-- A more complex nested function call -->
        <Multiply>
                <!-- Argument 1 -->
                <Add>
                        <!-- Argument 1.1 -->
                        <FloatConstant>123.45</FloatConstant>
                        <!-- Argument 1.2 -->
                        <FloatConstant>567.89</FloatConstant>
                </Add>
                <!-- Argument 2 -->
                <Negate>
                        <Add>
                                <!-- Argument 2.1 -->
                                <FloatConstant>111</FloatConstant>
                                <!-- Argument 2.2 -->
                                <FloatConstant>222</FloatConstant>
                        </Add>
                </Negate>
        </Multiply>
```

FIG. 12

```xml
<!-- A function call taking an arbitrary number of arguments (3 for this example) -->
<Sum>
        <!-- Argument 1 -->
        <Multiply>
                <!-- Argument 1.1 -->
                <Add>
                        <!-- Argument 1.1.1 -->
                        <FloatConstant>123.45</FloatConstant>
                        <!-- Argument 1.1.2 -->
                        <FloatConstant>567.89</FloatConstant>
                </Add>
                <!-- Argument 1.2 -->
                <Negate>
                        <!-- Argument 1.2.1 -->
                        <Add>
                                <!-- Argument 1.2.1.1 -->
                                <FloatConstant>111</FloatConstant>
                                <!-- Argument 1.2.1.2 -->
                                <FloatConstant>222</FloatConstant>
                        </Add>
                </Negate>
        </Multiply>
        <!-- Argument 2 -->
        <Add>
                <!-- Argument 2.1 -->
                <FloatConstant>123.45</FloatConstant>
                <!-- Argument 2.2 -->
                <FloatConstant>567.89</FloatConstant>
        </Add>
        <!-- Argument 3-->
        <Add>
                <!-- Argument 3.1 -->
                <FloatConstant>111</FloatConstant>
                <!-- Argument 3.2 -->
                <PercentageConstant>22</PercentageConstant>
        </Add>
</Sum>
```

FIG. 13

```xml
<!-- calling a void function that takes a Person structure -->
    <SavePersonDetails>
        <Person>
            <StringConstant>John Doe</StringConstant>
            <IntegerConstant>25</IntegerConstant>
            <FloatConstant>10000.00</FloatConstant>
        </Person>
    </SavePersonDetails>
    <!-- calling a void function that takes a Person structure and a float value -->
    <ModifyPersonSalary>
        <Person>
            <StringConstant>Jane Doe</StringConstant>
            <IntegerConstant>35</IntegerConstant>
            <FloatConstant>12000.00</FloatConstant>
        </Person>
        <FloatConstant>14000.00</FloatConstant>
    </ModifyPersonSalary>
</request>
```

SYSTEM AND METHOD FOR SPECIFYING APPLICATION SERVICES AND DISTRIBUTING THEM ACROSS MULTIPLE PROCESSORS USING XML

FIELD OF THE INVENTION

This invention relates to the field of distributed data processing systems, and, more specifically, to a system and method that uses XML to specify, validate and distribute functions over multiple processors in the distributed system.

BACKGROUND OF THE INVENTION

Today's data networks are becoming increasingly complex to meet the growing needs of users. Sophisticated data networks collect data, store data, analyze data, present data to users, etc., so that a user of this data may make informed decisions. Frequently, these tasks need to be carried out on more than one platform. Therefore, processing is distributed across many platforms (processors) in the network. In this context, a data client and the client's desired service platform may be one, two or several processors in the network.

XML provides a convenient mechanism for representing calls from a client application to a service application. It is simple to use, precise, flexible, portable and allows exchange of such requests between diverse applications, running on diverse platforms. An example of such an interface is the SOAP protocol (specified at: http://www.w3c.org/TR/2003/PR-soap-part0-20030507/). The SOAP specification essentially considers data packaged inside a request. The SOAP specification is mainly concerned with constraining the structure of the SOAP message.

However, SOAP cannot provide new functionality without changing the operational programs of client applications and service applications, especially if the applications are on distributed processors. Therefore, a problem in the art is that there is no simple method to specify new functionality that may potentially affect distributed data processing systems.

SUMMARY OF THE INVENTION

This problem is solved and a technical advance is achieved in the art by a system and method that uses XML schemas to specify the set of allowed calls, to invoke multiple function calls, either hierarchically (i.e., nested) or sequentially, and to specify the calls in such a way that they can be distributed across multiple processors.

In an exemplary embodiment of this invention, an XML schema mechanism defines the format of permitted requests and, importantly, validates the requests to ensure that they match the published signature of the functions provided by the service application. Additionally, the schema mechanism validates the request to ensure that it matches the published signature of any further service application that it may need to employ. In the context of this specification, "signature" means the number and data type of the various parameters that must be passed to a function, along with its return type (i.e., the meaning that is typically employed when dealing with traditional programming languages, such as C, C++ or Java). In addition, supplementary information added either within the schema itself or in supporting documents may be processed programmatically (e.g., generating data input screens, performing performance simulations, generating test data, etc.).

A typical request may consist of a hierarchy of function calls, either nested within one another or executing in series. This relationship can be made implicit in the request, although the relationship may be supplemented by explicit details. The hierarchy of function calls may also contain additional content that indicates the points at which it may be beneficial to distribute the processing across multiple secondary service applications.

Thus, the exemplary embodiment of this invention uses an XML document both to represent the initial request, containing markup to indicate where such distribution may be performed, and to provide the basis for subsequent requests.

BRIEF DESCRIPTION OF THE DRAWINGS

A more complete understanding of this invention may be obtained from a consideration of this specification taken in conjunction with the drawings, in which:

FIGS. 4-10 comprise a sample XML schema instance definitions for the purpose of illustrating the exemplary embodiment of this invention.

DETAILED DESCRIPTION

As stated above, XML schemas provide a convenient mechanism for representing calls from a client application to a service application. An exemplary embodiment of this invention extends XML schemas to include nested operations that may either be executed locally on the receiving service application or may be passed on to subsequent service applications (i.e., the current service application becomes the client for these secondary service applications).

The execution of both the caller and the service side of this mechanism is most advantageously performed in real-time, such that the client would construct the message as needed and pass this on to the service processor. The service processor would interrogate the message as it arrived and determine the appropriate response based on its content.

If a real-time approach is not possible, due to technical or other limitations, then an alternative approach is to use the schema (with possible supplementary details held either within the schema or separately) as the basis for generating the necessary programs to perform these operations. The generated programs could include any necessary steps required to integrate the software with the target runtime environment, e.g., to interface with any grid management software that may be employed. A grid computing framework is generally defined as a series of two or more processing units that can be used to support distributed processing, whereby a single unit of work may be broken up to be performed in parallel by each of the processing units. Thus, the overall end-to-end processing time is reduced. Grid management software is used to support this operation, for example, to optimize the distribution process, to support monitoring of the processing and to allow recovery in the event of errors. This alternative embodiment avoids the need for programmers to write all of the necessary code. It also simplifies the task of migrating to a different environment using a different set of interfaces, because this would merely involve modifying the code generator and then re-generating all of the necessary application code.

XML is also a hierarchy of named items, as is known in the art. The mapping onto a nested series of operations and their parameters according to the exemplary embodiment of this invention will be clear to one skilled in the art after studying this specification.

In this exemplary embodiment of this invention, the basic pattern encountered is a simple Composite:

An operation has a name and takes a number of arguments . . .

The arguments may either be simple value operands . . .

Or child operations

Theoretically, this pattern can be nested arbitrarily. The limitation of nesting will be dependant upon the specific implementation. This pattern is also common in expression evaluation such as:

Result=$a+(b*$ func1$(c-$func2$(d,e+4)))$

The above equation illustrates that an expression may generally be viewed as consisting of two operands and an operator, which is typically placed between them, in which each operand may itself be an expression.

Figure 1:
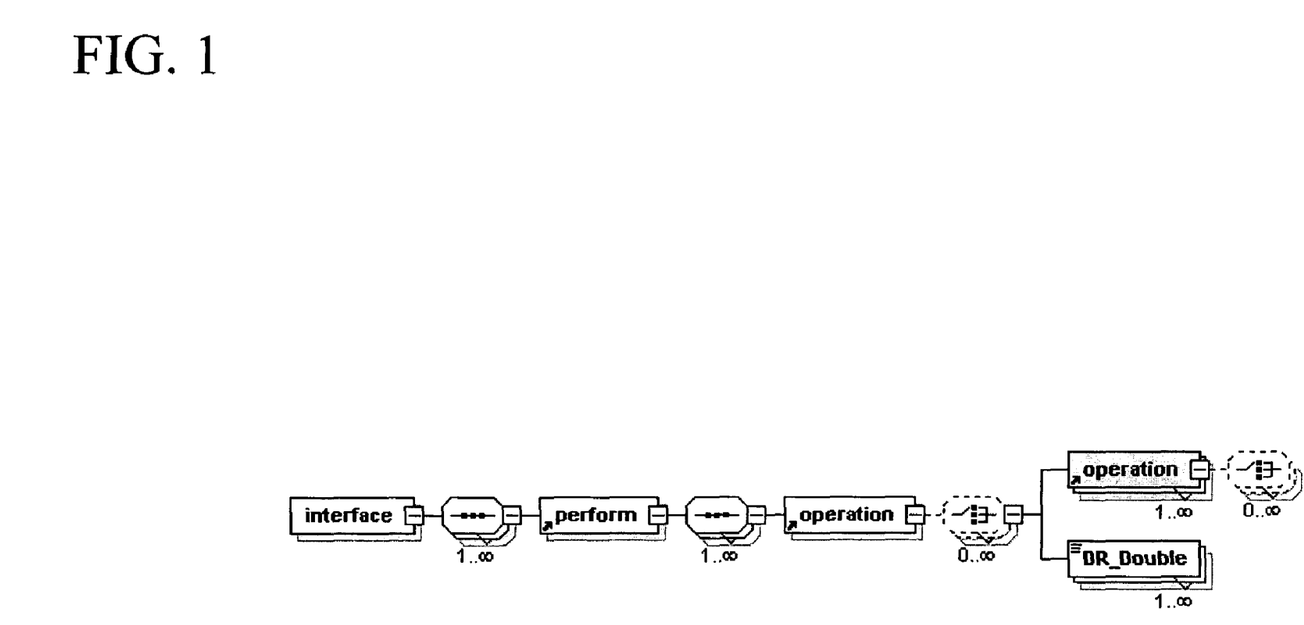
FIG. 1 is a block diagram of a simple XML specification demonstrating aspects of this invention.

Because the input can be presented as XML, XML Schema may be utilized to define valid input formats. For example, a rather "open" specification might look like FIG. 1 (note that the range of data types is deliberately limited here for clarity). XML Editors (e.g., XMLSpy, http://www.xmlspy.com) can use this to prevent the construction of invalid data, i.e., manually edited input (e.g., for test data). It can also be used to automatically validate the data at either the client or server side of the interface assuming the use of a validating parser (e.g., Xerces, http://xml.apache.org/xerces2-j/index.html). Schemas are generally accessed using URI embedded in the document to be validated. Such validation enables these to be maintained centrally (e.g., accessed over an intranet).

As stated above, it is possible to generate client-side code from input data. However, the fact that this is possible implies that the intermediate code may be cut out completely. Rather than generating code, calls are made directly from within the "code generator" itself. Such direct calls provide a generic evaluation engine, which is capable of passing data to any function.

Schemas are themselves represented as XML documents, that is, there is a schema that defines valid schemas. These schemas can be read and processed in much the same way as any other XML file. For example:

To generate data input screens

To generate test data

Most any other use

Server-side processing typically consists of extracting the data from the maps, validating it (e.g., testing the data type) and passing this through to, for example, "C" code. The transport from this point onwards is usually either simple values or more complex structures. According to this exemplary embodiment, it should be possible to code-generate this code too. However, the data/specification will need supplementary details, for example, the names of the structures and fields into which the data is to be put. In the examples shown in FIGS. 2 and 3, this is done using the standard "xs:appinfo" mark up facility, although other mechanisms should be evident to one skilled in the art after studying this specification. This could simplify the migration to the new approach and thus lead to shorter development times.

Figure 2:
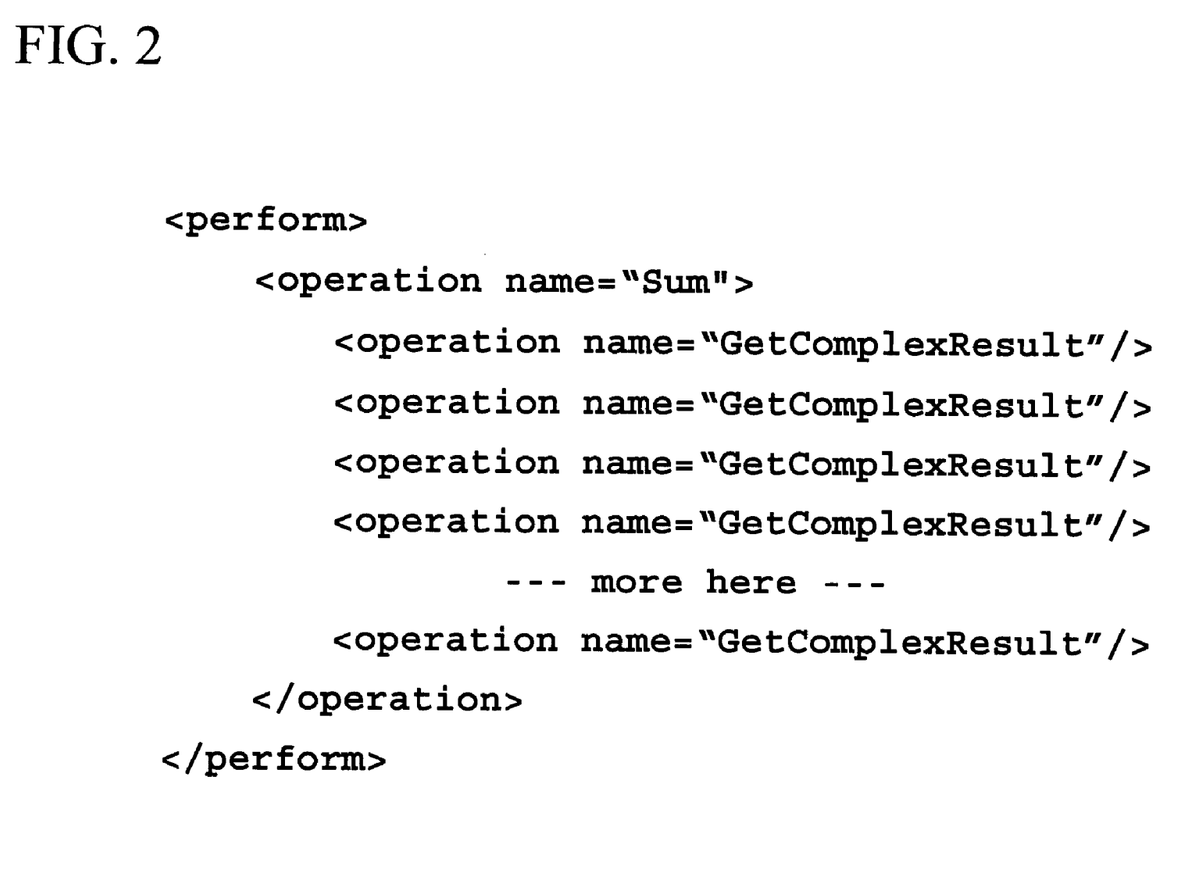
FIG. 2 is an example of a summing program.
Figure 3:
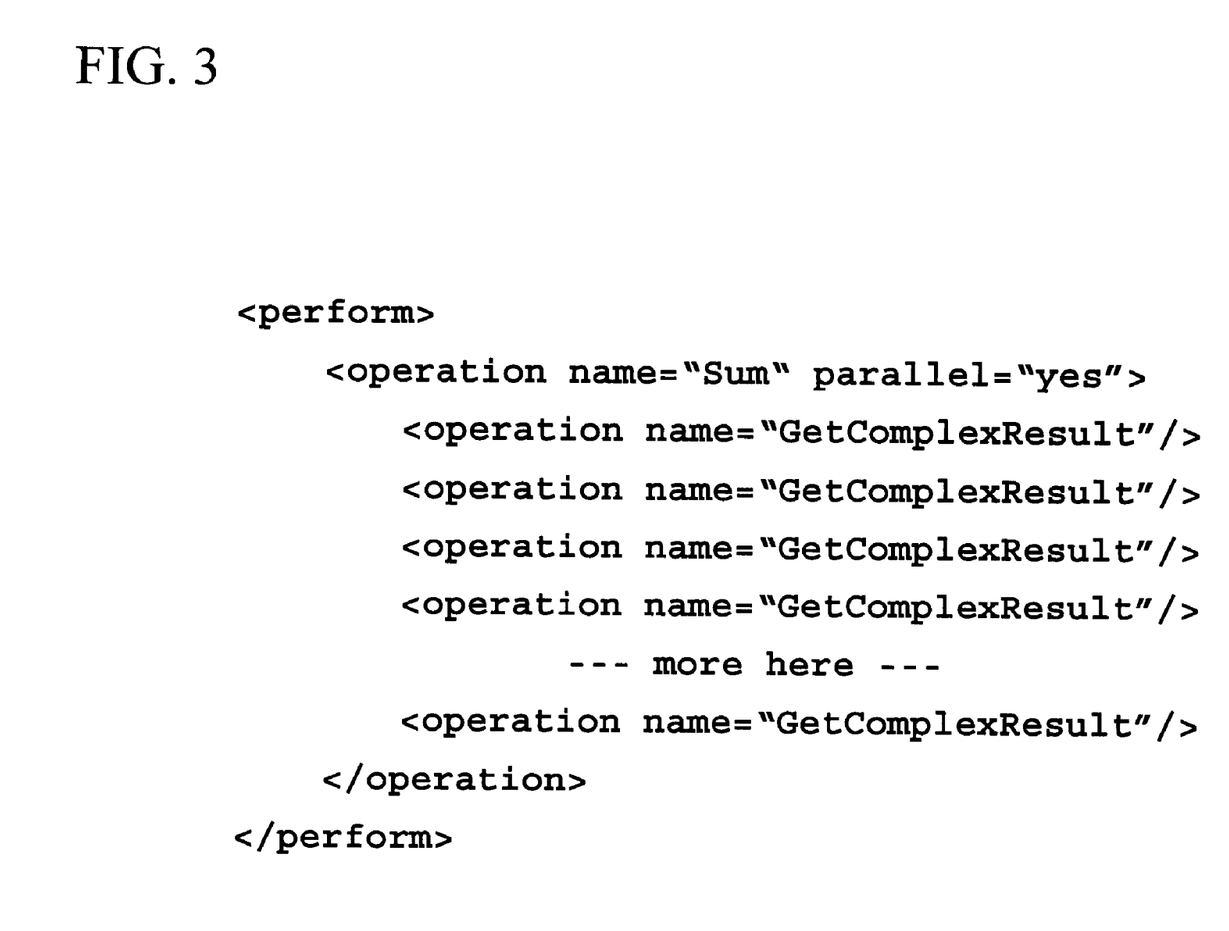
FIG. 3 is an example of the summing program of FIG. 2 specified to be performed in parallel.
Figure 6:
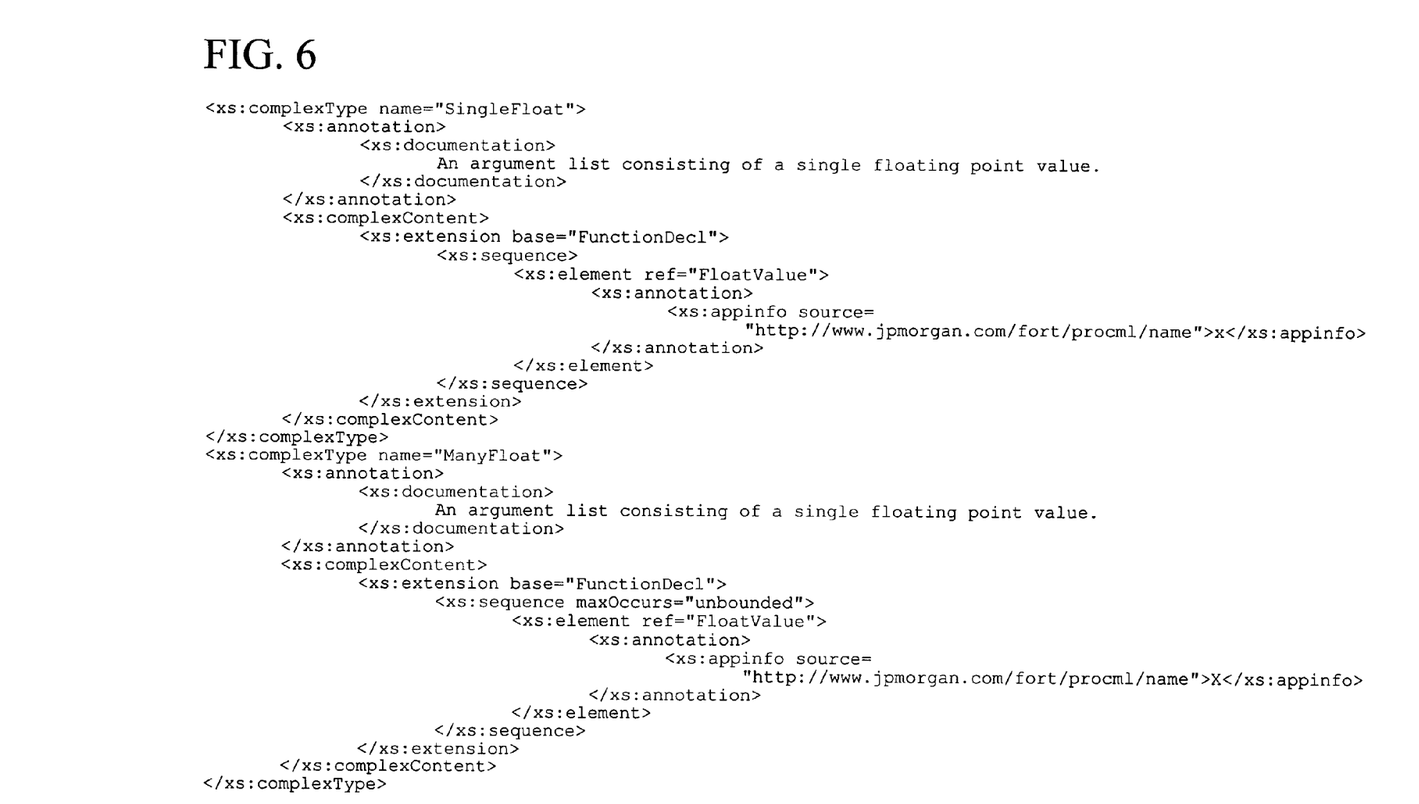
Figure 9:
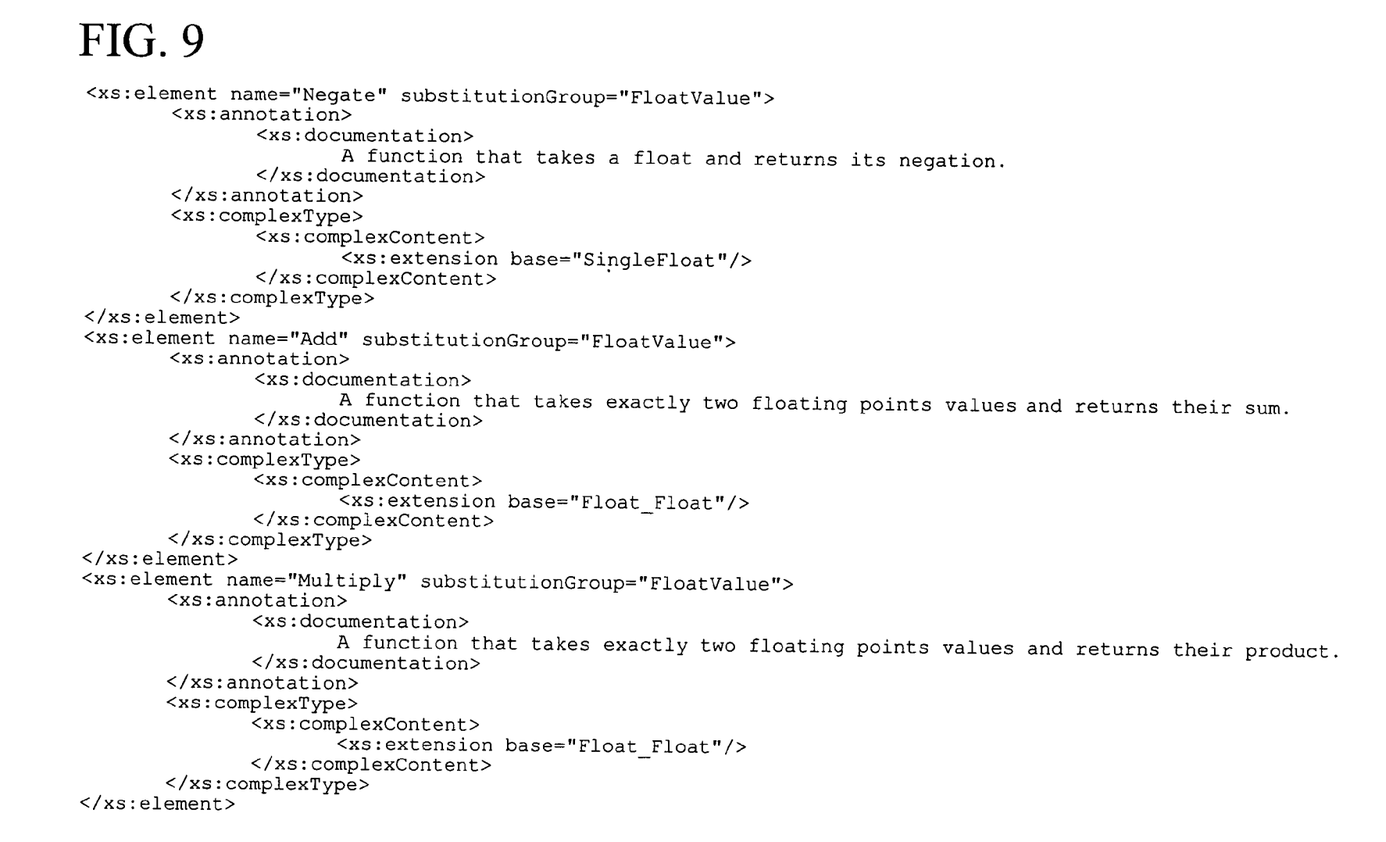
Figure 10:
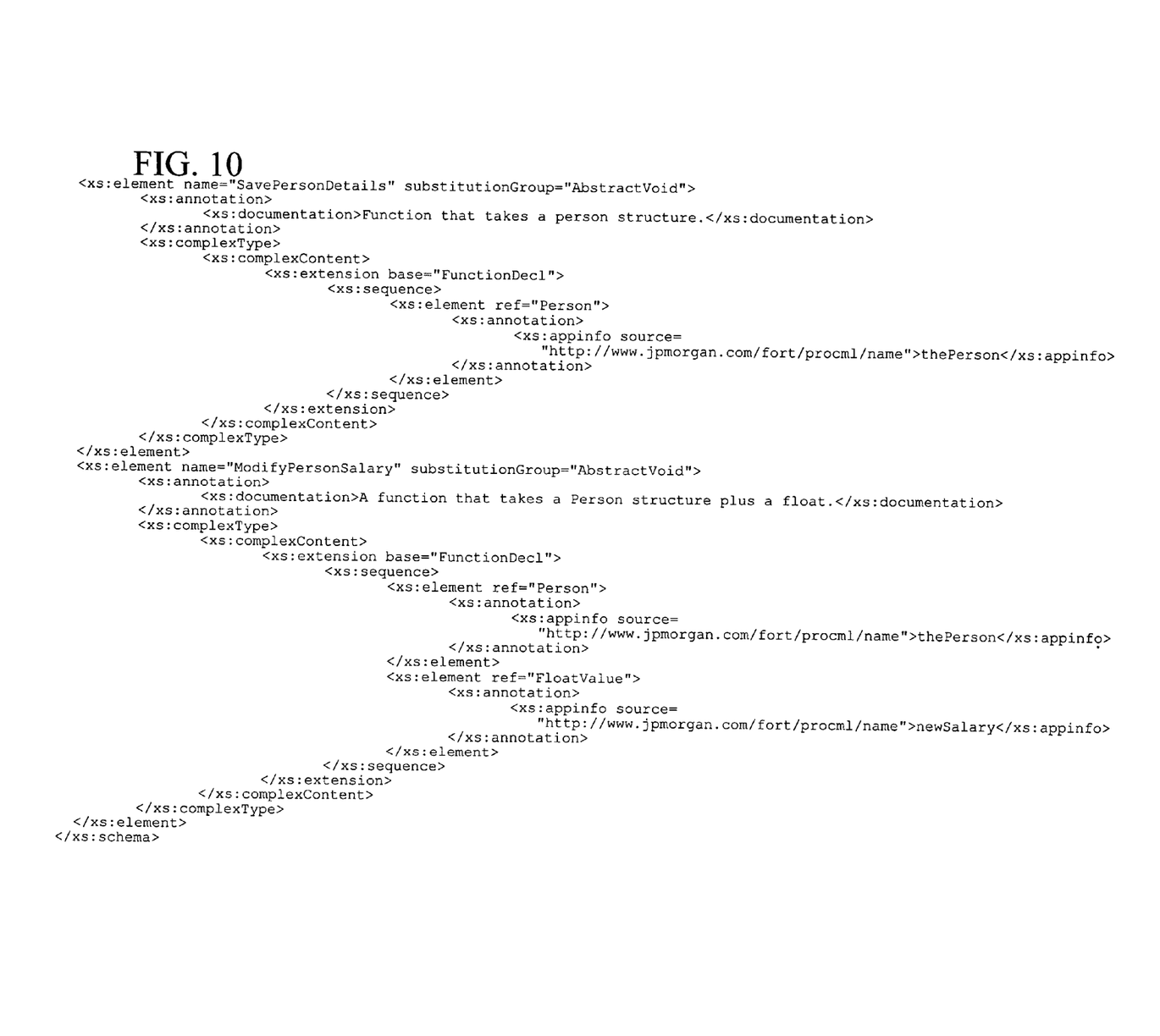

In the example of FIG. 2, code to sum the result of a large number of calculations is shown. The "natural" way of executing this would be to perform each calculation in series. However, if the input is modified in accordance with the code of FIG. 3, then code can be generated that performs the operation in parallel. This could be performed on either the client or the server side of the interface.

Further, the above could greatly reduce the overhead of migrating code to a grid computing framework by generating the wrapper code that is required for deployment. Further, this could be modified to use any alternative Grid that might be used in the future. For example, envisage a farm of data-driven evaluation engines, which parse their input and execute on-the-fly. This may possibly break up their input and pass it on to other evaluation engines. The forwarded request would essentially consist of a fragment of XML from the original request (with a small amount of "wrapping"). (As an aside, further annotation, with execution timings, could be used to simulate scenarios and predict timings, e.g., to allow worst-case processing times to be estimated).

Further extensions could allow chaining of results (plus many other possible features). For example, the above-described approach does not care where "splitting" occurs (i.e. client-side or server side). It retains the flexibility and loose coupling of the proposed new approach, while, significantly, adding a degree of formalism where appropriate. Services (i.e., operation providers) could be discovered on the fly, e.g. using UDDI (http://www.uddi/org), for example, just "throw" a request document at a generic calculation service and then wait for the result.

FIGS. 4-10 comprise an annotated XML schema. Definitions of elements are shown in these drawings as "documentation."

Figure 11:
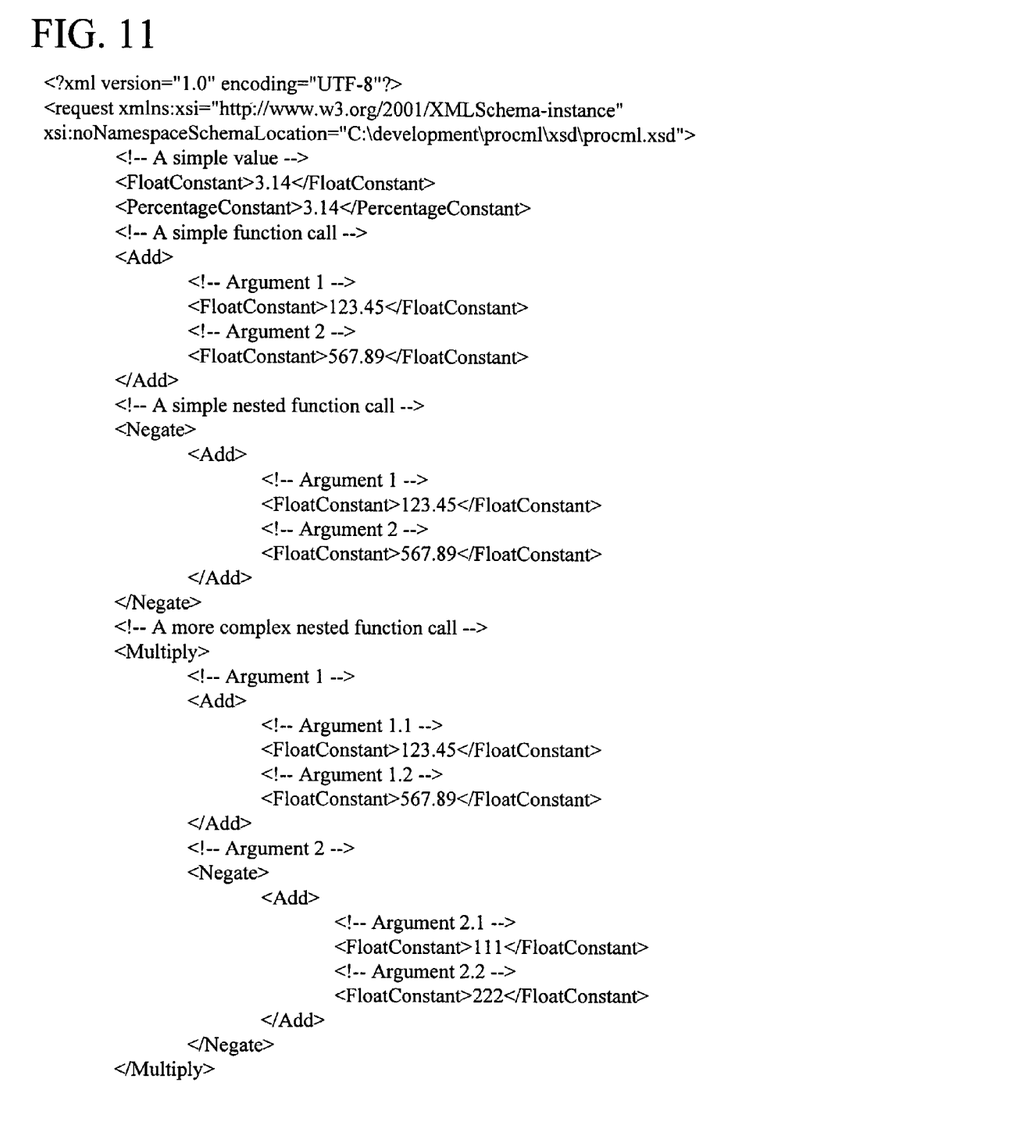
FIGS. 11-13 are exemplary use of the schema of FIGS. 4-10.
Figure 12:
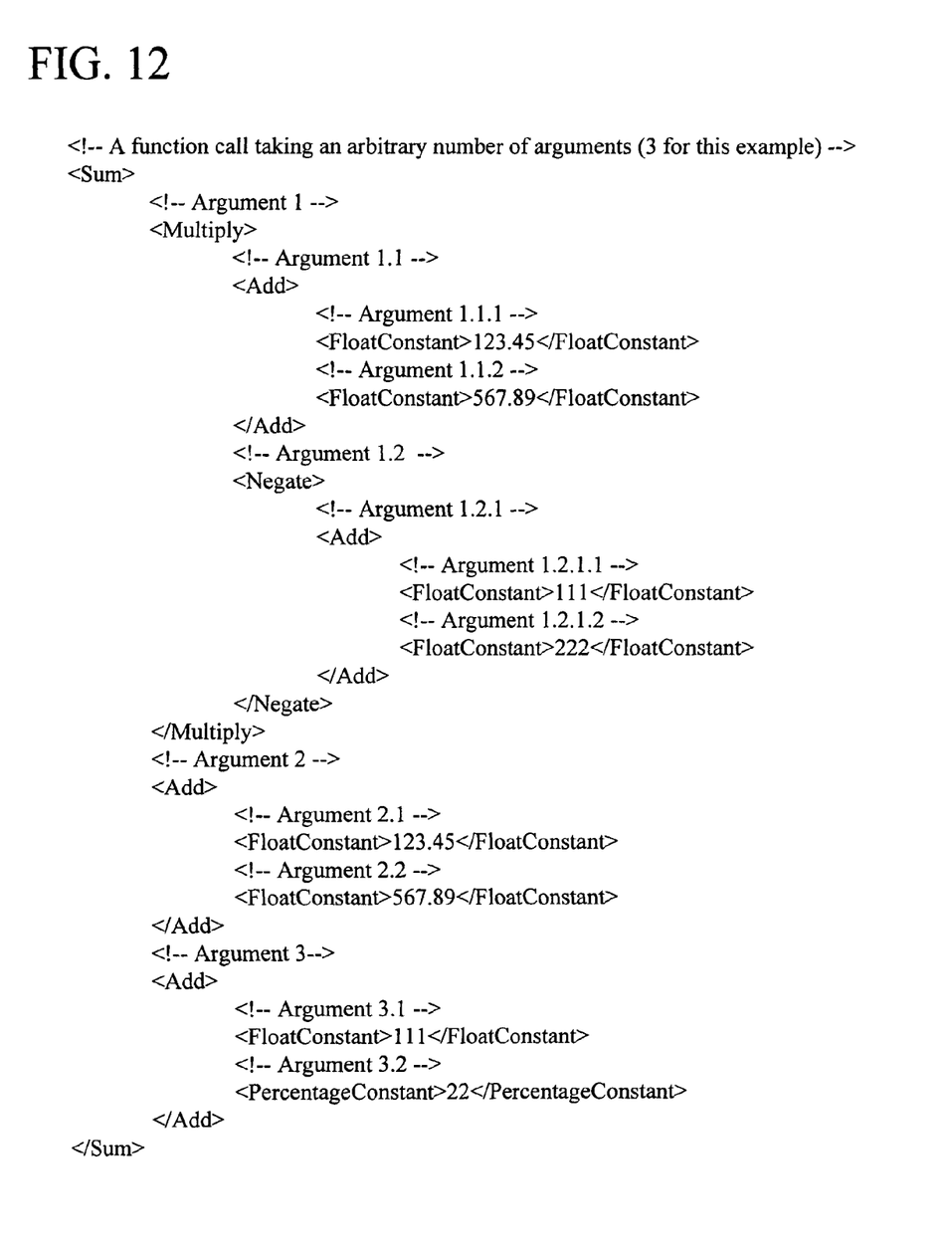
Figure 13:
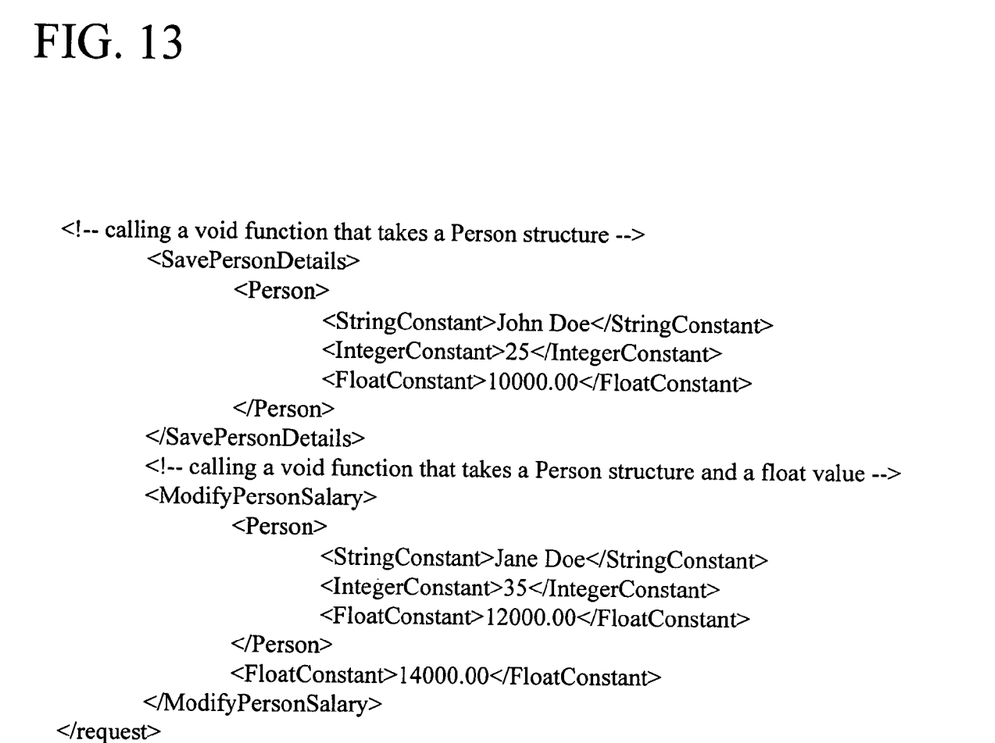

FIGS. 11-13 illustrate an XML schema that shows a number of examples. These examples make use of the schema of FIGS. 4-10, above. These examples can be validated against this schema. Note that the substitution group facility allows nesting of function calls arbitrarily, while ensuring that type-correctness is maintained (e.g., an Integer value or function cannot be passed to the Add function).

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

What is claimed is:

1. A method for use in a distributed processing system to specify an application service comprising:

defining a schema written in XML comprising a first operation having a plurality of arguments, the schema having a nested operation within said first operation;

validating the first operation's signature using said schema;

executing said first operation on a first processor in said distributed processing system in real time;

sending said nested operation to a second processor in the distributed processing system; and executing said nested operation on said second processor in said distributed processing system in real time, wherein said schema renders unaltered underlying function calls which define said first operation and said nested operation.

2. The method in accordance with claim 1 further comprising validating the first operation's payload after validation of the contents of the payload.

3. The method in accordance with claim 1 wherein defining a schema comprising a first operation having a plurality of arguments comprises defining a schema having a plurality of nested operations.

4. The method in accordance with claim 3 wherein defining a schema comprising a first operation having a plurality of nested operations comprises defining a schema having one or more nested operations in one or more of said nested operations.

5. The method in accordance with claim 2 wherein validating said schema further includes validating said nested operation.

6. The method in accordance with claim 3 wherein validating said schema further includes validating said plurality of nested operations.

7. The method in accordance with claim 4 wherein validating said schema further includes validating said one or more nested operations in one or more of said nested operations.

8. The method in accordance with claim 1 further including the step of generating a program to perform the defined operations.

9. The method in accordance with claim 1 further including the step of distributing operations to one or more members of the distributed system.

10. The method in accordance with claim 9 wherein said step of defining a schema includes indicating one or more points where distributing operations is beneficial.

11. The method in accordance with claim 1 wherein said operation and said nested operation are calls from a client application to a service application.

12. The method in accordance with claim 1 wherein said step of executing said operation further includes the steps of executing said operation at a first service application and executing said nested operation at a second service application.

13. A method for use in a distributed processing system to specify an application service comprising:
  defining a schema written in XML comprising a first operation having a plurality of arguments, the schema having a nested operation within said first operation, said first operation and said nested operation representing calls from a client application to a service application;
  validating the first operation's signature using said schema;
  executing said first operation on a first processor in said distributed processing system;
  sending said nested operation to a second processor in the distributed processing system;
  using said schema to generate a second program having an interface with grid management software, the second program and the grid management software being used to render the nested operation executable on said second processor; and
  executing said nested operation on said second processor in said distributed processing system,
  wherein said schema renders unaltered underlying function calls which define said first operation and said nested operation.

14. A method for use in a distributed processing system to specify an application service comprising:
  defining a schema written in XML comprising a first operation having a plurality of arguments, the schema having a nested operation within said first operation;
  validating the first operationts signature using said schema;
  executing said first operation at a first service application on a first processor in said distributed processing system in real time;
  sending the nested operation to a second processor in the distributed processing system from the first service application; and
  executing said nested operation at a second service application on said second processor in said distributed processing system in real time, said first service becoming a client application for said second service applieation,
  wherein said schema renders unaltered underlying function calls which define said first operation and said nested operation.

* * * * *